F. W. HOUGH.
SYSTEM FOR THE IDENTIFICATION OF VEHICLES OF THE MOTOR DRIVEN TYPE.
APPLICATION FILED FEB. 11, 1922.
1,429,347.                                                                 Patented Sept. 19, 1922.
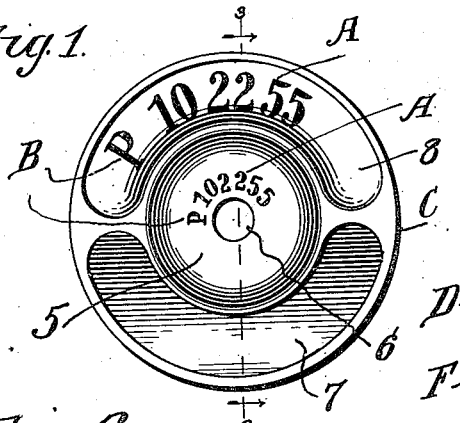
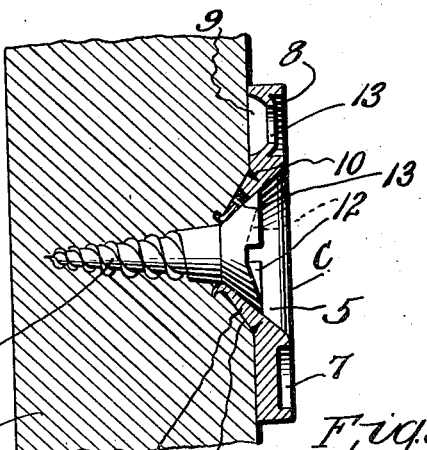
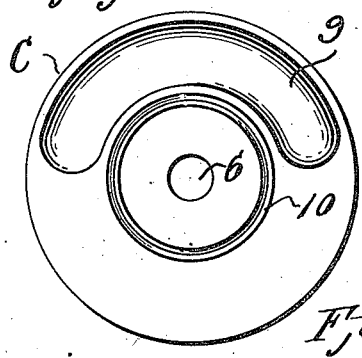
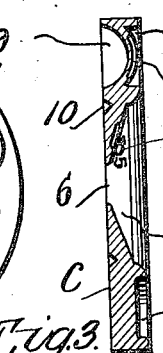
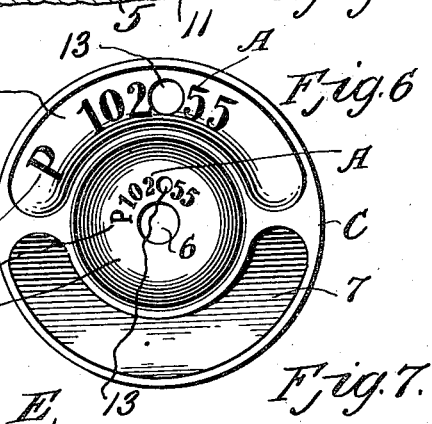
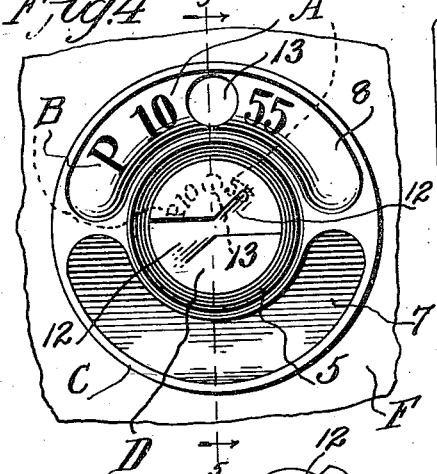
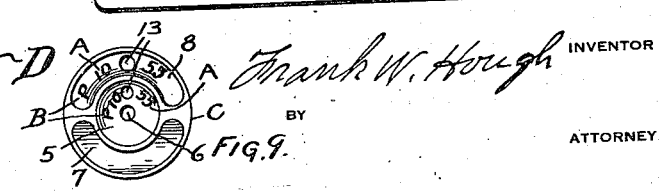
WITNESS: Louise Blank.
Frank W. Hough INVENTOR
BY
ATTORNEY Patented Sept. 19, 1922.

1,429,347

UNITED STATES PATENT OFFICE.

FRANK W. HOUGH, OF WASHINGTON, DISTRICT OF COLUMBIA.

SYSTEM FOR THE IDENTIFICATION OF VEHICLES OF THE MOTOR-DRIVEN TYPE.

Application filed February 11, 1922. Serial No. 535,772.

*To all whom it may concern:*

Be it known that I, FRANK W. HOUGH, a citizen of the United States of America, residing at Washington, District of Columbia, have invented certain new and useful Improvements in a System for the Identification of Vehicles of the Motor-Driven Type, of which the following is a specification.

This invention relates to a system which may be advantageously employed for the identification of vehicles of the motor driven type and also for the protection of the owners thereof against the unauthorized use of their property.

The primary object of the system is to enable an officer of the law to readily determine whether or not a vehicle identified in accordance with the system is being operated by a person other than one authorized by the owner and also to enable the owner of an identified vehicle which has been stolen and abandoned to establish his right of ownership of the stolen property and identify his vehicle to the satisfaction of the authorities, irrespective of the fact that the engine number may have been altered, the vehicle supplied with dead license tags and in other ways disguised.

Another object of the invention is to provide a system whereby numbers may be used for the identification of vehicles, said numbers having the numerals therein so arranged and mutilated in such a manner that it will be practically impossible for an unauthorized user of an identified vehicle to correctly state the identification number assigned to the vehicle if questioned by an officer of the law regarding his right to operate the vehicle.

Another object of the invention is to provide a system in accordance with which the identification number assigned to the vehicle may not only be applied thereto through the use of labels of novel construction, but the labels may be arranged about the machine in such a manner that not only will the system not be rendered ineffective through the loss of one of the labels, but the recognition and removal of one of the labels by a thief will have a tendency to lead the thief to believe that the means of identification had been removed, and thus discourage an attempt by the thief to locate the other label.

Another object of the invention is to so construct the labels and to provide means for the attachment of one of the labels to an instrument board on a vehicle that an unauthorized attempt to pry loose the label from the instrument board will result in a portion of the label being left concealed upon the board for identification purposes.

Another object of the invention is to provide a system of identification for motor vehicles wherein a certificate intended to be carried by the operator of an identified vehicle when printed in accordance with the system will not only verify the number assigned to the vehicle and specify the mutilation of the number in order that the number may be rendered legible, but will state the location of the concealed label, thus enabling an operator of an identified vehicle to verify his statements to an officer of the law if questioned regarding the identification number on the vehicle, or the place of concealment of the hidden label.

A further object of the invention is to provide a system which embodies an identification label which when in use will indicate the state in which the license tags intended to be carried by the machine were procured.

With these and other objects in view the system resides in the use of mutilated identification numbers and tag verifying letters which are arranged in pairs upon labels carried by an identified vehicle, and a certificate adapted to be carried by the owner of the vehicle.

The preferred embodiment of the system has been illustrated in the accompanying drawing, but no restriction is necessarily made to the precise details of the identification labels, or the certificate herein shown, as minor changes or alterations in the labels and certificate which fall within the scope of the appended claims may be resorted to if desired.

In the drawings:—

Figure 1 is a face view of an identification label employed in carrying out the system.

Figure 2 is a view in elevation showing the opposite side of the label shown in Figure 1.

Figure 3 is a sectional view on the line 3—3 of Figure 1.

Figure 4 is a view in elevation of an identification label showing the same applied to a portion of an instrument board and having the identification number upon the label mutilated in accordance with the system.

Figure 5 is a sectional view on the line 5—5 of Figure 4.

Figure 6 is a view in elevation of an identification label forming a part of the system and showing a modification of the arrangement of the numerals in the identification number.

Figure 7 is a view of the certificate of identification employed in the carrying out of the system.

Figure 8 is a detail perspective view of a portion of a securing element by means of which one of the identification labels is intended to be applied to a vehicle.

Figure 9 is a view of the label which is intended to be concealed about an automobile identified in accordance with the system.

Referring now to the drawing in detail, the preferred embodiment of the system has been disclosed as comprising the use of an identification number designated by the letter A and with the numerals comprising the number preferably arranged in pairs, although, as shown in Figure 6 in the drawing, the numerals may be arranged in the usual order. The number 10 22 55 has been used in connection with the labels in the drawing for illustration purposes, but in the operation of the system the identification number must contain at least three numerals and it is intended to number each set of labels consecutively.

A letter designated in the drawing by B is used in combination with the identification number and is intended to designate the State in which the license tags ordinarily carried by the machine were obtained.

The identification number A and the tag designating letter B are stamped in duplicate into each of a plurality of identification labels C preferably formed of some ductile metal and by means of which the identification numbers can be applied to the vehicle.

Under the system one of the labels C is intended to be concealed about the vehicle to be identified by the numbers upon the label, and the other of the labels is intended to be secured to the instrument board of the identified vehicle through the medium of a screw D having a mutilated head.

A certificate of identification E which is intended to be carried upon the person of the owner, or operator of the vehicle, not only bears printed matter identifying the owner of the vehicle and specifying persons authorized to operate the same, but also defines the mutilation of the identification numbers on the labels and gives their location upon the vehicle. Thus, the authorized operator of an identified machine would experience little difficulty in establishing to the satisfaction of an officer of the law his right to operate the machine should one of the labels have been maliciously removed from the vehicle. In the event that the certificate of identification was temporarily misplaced an authorized operator of an identified vehicle would merely have to state the location of the concealed label to convince an officer of the law of his right to operate the vehicle.

The labels C may be made of any ductile and noncorrosive material and are preferably in the form of metallic disks about the thickness of a dime and of a diameter corresponding to that of a twenty-five cent piece. Each of the labels C has formed in its front face a circular countersunk portion 5 in the center of which is an opening 6. The front face of each label is recessed at 7, and at 8. The rear face of each label is recessed at 9 to cause the portion of the disk between the recesses 8 and 9 to be relatively thin and arched. The reason for arching the thin portion of the disk between said recesses is to render the fragile portion of the label sufficiently strong to enable the numerals comprising the identification number to be imprinted in the metal when a die is arranged within the recess 9, but the arched portion of the label will not be sufficiently strong to withstand an attempt by a thief to alter the identification number with a punch.

The identification number A and the tag letter B on the arched portion of the label is duplicated upon the countersunk portion 5, and in the event that the label is displayed on the instrument board the tag verifying letter and identification number are concealed by the head of the attaching screw. In the recess 7 may be printed the name and address of the operator of the system.

Formed in the rear face of each label C and co-extensive in diameter with the countersunk portion 5 of the label is an annular groove 10. When one of the labels C is in applied position upon an instrument board of an identified vehicle, should an attempt be made by a thief to destroy the label by prying loose the label from the board, the groove 10 will allow the portion of the label beyond the attaching screw to break loose from the countersunk portion of the label.

Another object of grooving the rear face of each disk is to enable the countersunk portion 5 to be forced by the head of the attaching screw D within a pocket 11 formed in an instrument board F with a pen knife or the like, thus supplying each label with a portion equipped with an identification number and tag letter which will be effectually concealed behind the head of the attaching screw and within the pocket in the instrument board should the label be maliciously destroyed by being pried loose from the machine.

It is preferable to form the opening 6 in the countersunk portion 5 of each label of less diameter than the shank of the screw, so that when the shank of the screw is forced through the opening the edge of the countersunk portion 5 adjacent the hole 6 will be split, and rolled and forced by the screw into the instrument board in such a manner as to prevent the countersunk portion being removed from behind the head of the screw without mutilating the board to such an extent that its defacement serves as notice that a malicious attempt had been made to destroy the identification label upon the board.

The screw by means of which one of the labels can be attached to the instrument board has a portion of its head at opposite ends of the kerf beveled, as at 12, so that although the screw may be readily driven into the instrument board with a driver it cannot be removed from the board with a tool of this character. Where the instrument boards are of metal the head of the screw may be used to form the pocket in the metal for the counter sunk portion of the label, and the screw may be retained in the board and in engagement with the label by a nut on the shank of the screw which may be held against rotation by mutilating the threads on the screws.

To render it practically impossible for anyone uninformed of the identification number which has been assigned to the vehicle and carried by the identification labels thereon; and without the certificate of registration, to state to the satisfaction of an officer of the law the identification number of an identified vehicle a pair of the numerals forming a part of the identification number on each label are removed by punching a hole 13 at each place on each label at which the identification number occurs.

By mutilating the identification number in the manner described it is practically impossible for an unauthorized operator of the vehicle to guess off hand the identification number and should by any chance the correct identification number be guessed by the operator his failure to have possession of the certificate of identification, or to be able to state the location of the concealed label would be sufficient evidence to an officer of the law of the unauthorized use of the vehicle.

From the foregoing it will be obvious that the temporary loss of the certificate of identification, or the removal of the label from the instrument board of an identified vehicle should cause an authorized operator of the vehicle no inconvenience, as he could readily prove his authority to an officer of the law to operate the vehicle by stating the location of the concealed disk and the numerals which had been struck therefrom.

Should an identified machine have been stolen and abandoned with an altered engine number, dead license tags and the detachable portion of the label removed from the countersunk portion of the identification label on the instrument board of the machine, the authorities upon recovery of the machine would but have to remove the attaching screw in the proper manner to obtain the identification number and tag letter on the countersunk portion of the destroyed label. With the above information in possession of the authorities either the authorities in the State in which the tags were issued, or the operator of the above described system could be communicated with and the name and address of the owner of the recovered machine ascertained.

When notified of the recovery of the vehicle the owner of the stolen machine with the certificate of identification in his possession would have little difficulty in establishing his ownership of the recovered vehicle and in identifying his property by revealing to the authorities in the State in which the machine was recovered the place of concealment of the hidden label.

From the foregoing it will be obvious that a simple, inexpensive and efficient system for the identification of vehicles of the motor driven type and the protection of the owners thereof has been described.

Having thus described the system what is claimed as new, is:

1. An identification label having a central opening, a countersunk portion in said label about said opening, a continuous groove in said label adjacent to said countersunk portion, and a recess in said label beyond said groove having a relatively thin wall of concavo convex shape in cross section.

2. In a system for the identification of vehicles of the motor driven type, a label having ordinarily indecipherable identification matter thereon also a thin arched portion on which a portion of said ordinarily indecipherable identification matter is arranged.

3. In a system for the identification of vehicles of the motor driven type, a label having ordinary indecipherable identification matter thereon also a portion adapted to be broken from the label having a thin arched portion upon which a portion of said ordinarily indecipherable identification matter is arranged.

4. In a system for the identification of vehicles of the motor driven type, a label having a portion adapted to be broken from the label having a thin arched portion having ordinarily indecipherable identification matter thereon, and a countersunk portion in said label also having ordinarily indecipherable identification matter thereon.

5. In a system for the identification of vehicles of the motor driven type, a label having a countersunk portion having an opening therein also identification matter ordinarily rendered indecipherable by said opening, and a portion on said label breakable from said countersunk portion having an opening therein and also identification matter rendered ordinarily indecipherable by said opening.

6. In a system for the identification of vehicles of the motor driven type, a label having a countersunk portion having an opening therein also identification matter rendered ordinarily indecipherable by said opening, a portion on said label breakable from said countersunk portion having an opening therein and also identification matter rendered ordinarily indecipherable by said opening, and means for attaching said label to a support adapted to conceal said identification matter in said countersunk portion.

In testimony whereof I affix my signature.

FRANK W. HOUGH.